United States Patent [19]
Edwards et al.

[11] Patent Number: 6,110,599
[45] Date of Patent: Aug. 29, 2000

[54] BLENDS OF POLYETHYLENE FOR EXTRUSION COATING

[75] Inventors: Ray Edwards, Henderson; Bruce Alexander Gillespie, Overton, both of Tex.

[73] Assignee: Eastman Chemical Company, Kingsport, Tenn.

[21] Appl. No.: 09/048,455

[22] Filed: Mar. 26, 1998

Related U.S. Application Data

[60] Provisional application No. 60/055,768, Aug. 14, 1997, and provisional application No. 60/043,935, Apr. 21, 1997.

[51] Int. Cl.[7] .......................... B32B 15/08; B32B 27/00; B32B 23/08; B32B 23/04; C08L 23/00
[52] U.S. Cl. ..................... 428/461; 428/500; 428/507; 428/532; 525/88; 525/240
[58] Field of Search .................. 525/50, 51, 88, 525/90, 240; 428/457, 461, 483, 500, 532

[56] References Cited

U.S. PATENT DOCUMENTS

| | | |
|---|---|---|
| 4,339,507 | 7/1982 | Kurtz et al. |
| 5,089,322 | 2/1992 | Matsunaga et al. .................... 428/220 |
| 5,248,364 | 9/1993 | Liu et al. ........................... 156/244.11 |
| 5,268,230 | 12/1993 | Edwards . |
| 5,350,476 | 9/1994 | Edwards . |
| 5,510,180 | 4/1996 | Liu et al. ............................... 428/332 |
| 5,756,193 | 5/1998 | Yamamoto et al. .................... 428/220 |

FOREIGN PATENT DOCUMENTS

| | | |
|---|---|---|
| 0 735 090 A1 | 10/1996 | European Pat. Off. . |
| 59-071349 | 4/1984 | Japan . |

*Primary Examiner*—Paul Thibodeau
*Assistant Examiner*—Sheeba Ahmed
*Attorney, Agent, or Firm*—Jonathan D. Wood; Harry J. Gwinnell

[57] ABSTRACT

A blend of at least three different polyethylene-based components is described which can be extrusion coated onto a substrate to give a strong bond therewith with short curing times. The blend comprises a medium density polyethylene with a narrow molecular weight distribution, a low density polyethylene homopolymer with a broad molecular weight distribution, and a linear low density polyethylene copolymer.

16 Claims, 1 Drawing Sheet

BLENDS OF POLYETHYLENE FOR EXTRUSION COATING

CROSS-REFERENCE TO RELATED APPLICATIONS

This Application claims the benefit of priority under 35 USC §119(e) of Provisional Application No. 60/055,768, filed Aug. 14, 1997, and Provisional Application No. 60/043,935, filed Apr. 21, 1997, which are incorporated by reference herein.

FIELD OF THE INVENTION

The present invention relates to a blend comprising three polyethylene components particularly useful as a coating on a substrate. The blends according to the present invention provide a quick bond to primed polymeric films when extrusion coated thereon.

BACKGROUND OF THE INVENTION

Prior art blends containing two polyethylene components, one component being a linear low density polyethylene and one component being a low density polyethylene, such as Dow Chemical Company's Linear Low Density Polyethylene 3010, are useful in certain extrusion coated structures. Examples of such structures are flexible polymeric film/paper packages for foods, and metallized polymeric film balloons. The structures comprise a substrate extrusion coated with the prior art blends of polyethylene. The extrusion coatings serve as heat seal media and as barriers to protect the contents of a package, e.g., food, from outside contamination, or to retain the contents, e.g., helium in a coated and sealed balloon. The linear low density polyethylene component of the prior art two-component blend is used to provide the strong heat seal strengths associated with each application's structure.

The substrates (e.g., polymeric films or metal films used in the articles described above) do not readily accept the prior art two-component polyethylene blends to permit good bonds between the extrusion coatings and the films. Therefore, the substrates are usually primed prior to extrusion coating with a water-soluble primer. Typically, a primer comprising polyethyleneimine is used. A particularly preferred polyethyleneimine primer is MICA Corporation's A-131X formulation. The primer readily wets the surfaces of the substrate and adheres thereto. The prior art polyethylene blends are then applied to the polyethyleneimine primer surface by an extrusion coating process well-known in the art. This extrusion coating application of the prior art polyethylene blends can, with sufficient curing time, ultimately permit a satisfactory bond between the prior art polyethylene blend and the polymeric films.

However, there is a problem associated with this extrusion coating process involving the prior art polyethylene blends. The prior art polyethylene blends, such as those claimed in U.S. Pat. No. 4,339,507, when extrusion coated against the polyethyleneimine primer, do not provide a satisfactory immediate bond. Instead, the prior art blends, containing a linear low density polyethylene component made by copolymerizing octene with an ethylene homopolymer, require a curing time to reach a minimally acceptable bond strength, usually considered to be about 450-g/inch (177-g/cm). Such curing times usually range from about 15-minutes to 2-hours. During these curing times, the extrusion coating operator does not know if the extrusion coated products, coated with the prior art polyethylene blends, will exhibit satisfactory structural integrity, i.e., a satisfactory bond strength between the substrate and the coating in the presence of the thin polyethyleneimine primer layer between the coating and the substrate.

Thus, during these curing times the operator continues to extrusion coat a product which may prove to be defective and unusable. Most extrusion coating production processes operate at line speeds in excess of 800-fpm (245-m/min). When the required curing times of about 15–120 minutes are considered in such an operation, a significant amount of extrusion coated product can be wasted with resulting economic losses to the extrusion coating operation.

Thus, there is a need for an extrusion coating polyethylene blend containing a linear low density polyethylene component that would give quick bond to a polyethyleneimine primed substrate, preferably about an order of magnitude faster bond. Such a blend would provide an extrusion coating operator with immediate knowledge as to the bond strengths of the product without the long waiting time required of the prior art blends.

SUMMARY OF THE INVENTION

The present inventors have unexpectedly discovered an improved extrusion coating polyethylene composition which permits immediate bond to a polyethyleneimine primed substrate. By "immediate bond" is meant that a commercially-satisfactory bond is formed in 5 minutes or less, preferably in 1 minute or less. In a preferred embodiment, the bond strength will be at least 450 g/inch (177-g/cm) in 5 minutes or less and more preferably in 1 minute or less.

The present invention provides for a composition of matter consisting of three-components: a first component, component A, which is a low melt index, medium density polyethylene, providing resistance to package seal failures, or "pop-open" resistance, when exposed to a secondary heat source; a second component, component B, which is a low density polyethylene having a broad molecular weight distribution, to provide good wetting of the polyethyleneimine primer surface for good bond; and a third component, component C, which is a linear low density polyethylene, preferably a copolymer of ethylene and one other α-olefin comonomer, to effect strong heat seals.

The three-component blends of the present invention also unexpectedly give heat seals with strengths equivalent to those of the prior art two-component blends, even with the prior art blends containing a significantly higher level of linear low density polyethylene.

The present invention is also directed to a composite comprising a substrate, either primed or unprimed, having the aforementioned composition coated thereon. The primer used is preferably a water-soluble primer, more preferably a polyethyleneimine primer. Furthermore, the present invention includes a laminate including a layer comprising the aforementioned polyethylene blend composition between two similar or dissimilar substrates, optionally including a primer layer between the polyethylene blend and each substrate. Such a composite or laminate may be formed into an article, such as a package for food, having excellent barrier properties, e.g., the package is impermeable to liquids and gases.

Thus, an object of the present invention is to provide for a composition of matter comprising three different polyethylene components, useful for extrusion coating of various substrates.

Another object of the invention is to provide for a polyethylene blend giving a bond strength of at least 450 g/inch to a primed polymeric film substrate.

Still another object of the invention is to provide for an extrusion coating composition which provides for a commercially-acceptable bond to a primed substrate within about 1 to 5 minutes or even less.

These and other objects, features, and advantages will become apparent as reference is made to the accompanying drawing and the following detailed description, preferred embodiments, and specific examples of the present invention.

DETAILED DESCRIPTION OF THE INVENTION

Figure 1:
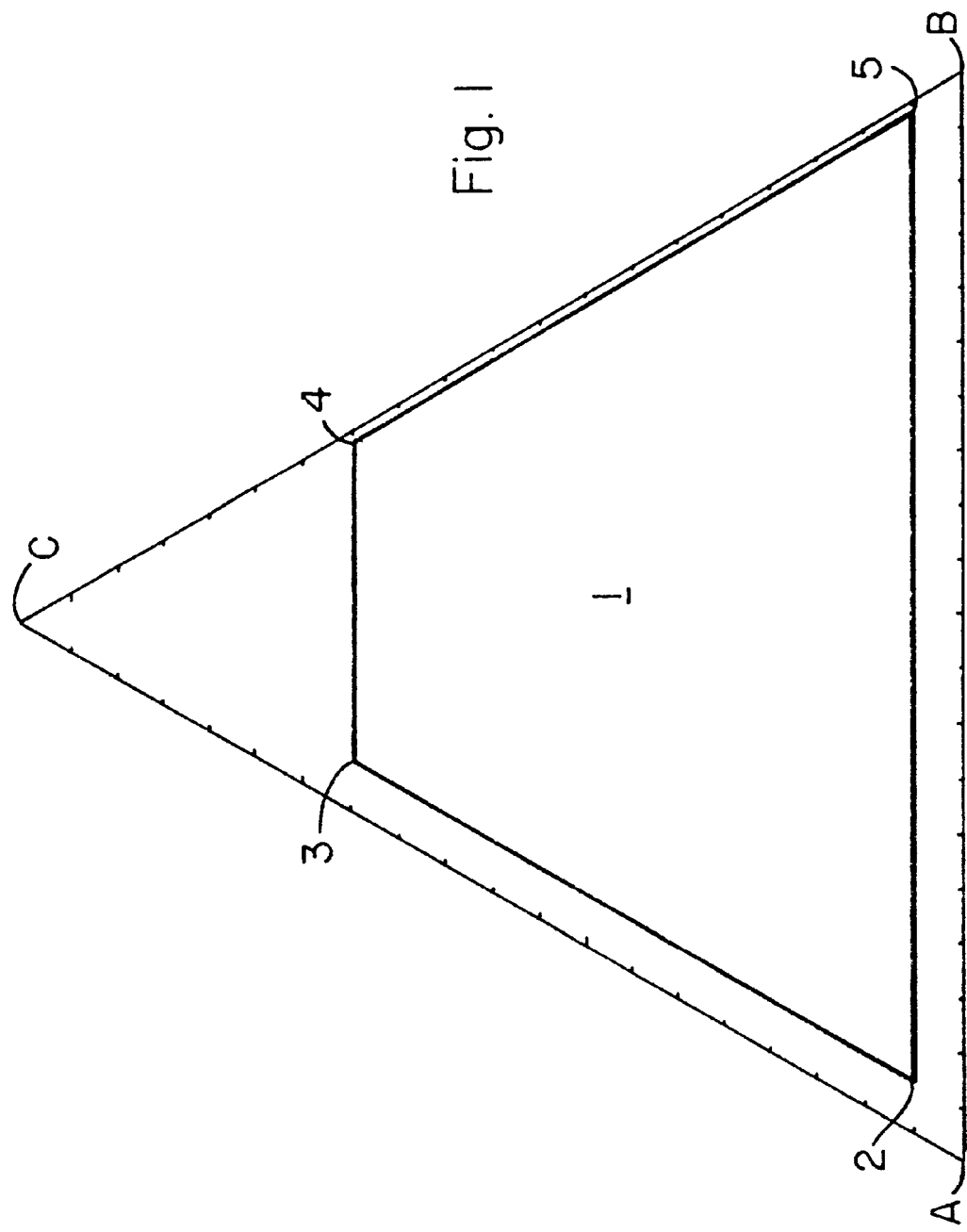
FIG. 1 is a ternary graph showing the preferred composition of the three-component blend according to the present invention. Component A, a medium density, low melt index polyethylene component, ranges from about 1 to about 90 weight percent. Component B, a low density polyethylene component having a broad molecular weight distribution, ranges from about 5 to about 94 weight percent. Component C, a linear low density polyethylene copolymer component ranges from about 5 to about 65 weight percent.

The blend according to the present invention comprises a first component, component A, which is a low melt index, medium density polyethylene, with a narrow molecular weight distribution, providing resistance to package seal failures, i.e., hot tack strength or "pop-open" resistance, when exposed to a secondary heat source. The terms "low melt index", "medium density" and "narrow molecular weight distribution" are well-known in the art and the appropriate polyethylene could be selected without undue experimentation. U.S. Pat. Nos. 5,268,230 and 5,350,476, co-pending U.S. Application No. (not yet assigned) entitled "Extrusion Coating Process for Producing a High Gloss Polyethylene Coating", filed Feb. 13, 1998, and based on the Provisional Patent Application entitled "High Gloss Polyethylene Coating", filed Feb. 19, 1997, (Eastman Chemical Company Docket No. D70537), and co-pending U.S. Application No. (not yet assigned) entitled "Polyethylene Providing Smooth-Finished Paperboard Laminates, filed Mar. 9, 1998, and based on the Provisional Patent Application entitled "Low Melt Index Polyethylene Providing Smooth-Finished Laminates", filed Apr. 9, 1997, (Eastman Chemical Company Docket No. D70632) describe compositions of polyolefins and processes to produce high gloss extrusion coatings and smooth paper laminates, which, unexpectedly, are useful as the first component in the present invention. The aforementioned Patents and Applications are hereby incorporated by reference in their entirety.

The first component, component A, is preferably a polyethylene having a melt index of about 0.5-dg/min to about 10-dg/min, more preferably about 0.5-dg/min to about 4-dg/min, even more preferably about 0.5-dg/min to about 3-dg/min. The most preferable melt index is about 1.7-dg/min. The polyethylene disclosed in the aforementioned co-pending Applications is a polyethylene of narrow molecular weight distribution having a melt index of 0.5-dg/min to 4-dg/min at 190° C., a swell ratio of 1.2 to 1.35, an annealed density of about 0.926-g/cc to 0.94-g/cc, and a polydispersity index at or below 9. This same polyethylene is the most preferred polyethylene used in the present invention as the first component.

As shown in FIG. 1, this first component (or component A) in the composition according to the present invention, comprising the blend described by 1 in the ternary graph, comprises about 1 percent (the line between points 4 and 5) to about 90 percent (or point 2) of the blend (percent by weight). In FIG. 1, point A represents 100 percent of component A and the line between points B and C represent zero percent of component A. In a preferred embodiment, the first component is present in the amount of about 20 to about 65 weight percent. In another preferred embodiment of the invention, the first component A is the major component of the blend, meaning that it is present in the amount of greater than 50 weight percent.

The blend according to the present invention also contains a second component, component B, being a low density polyethylene having a broad molecular weight distribution, which provides for a good wetting of the primed substrate, which in turn permits a strong bond to the primed substrate. The terms "low density" and "broad molecular weight distribution" are well-known in the art, and one of ordinary skill could select such a polyethylene without undue experimentation. In the preferred embodiment of the present invention wherein a polyethyleneimine primer is used, the second component is a low density polyethylene homopolymer of broad molecular weight distribution having a melt index range of about 3-dg/min to about 40-dg/min, more preferably 6-dg/min to about 30-dg/min, even more preferably about 18-dg/min to about 22-dg/min, most preferably 20-dg/min, measured at 190° C., and having a swell ratio greater than 1.60, an annealed density of about 0.91-g/cc to about 0.92-g/cc, and a polydispersity above 9. In a preferred embodiment, component B has a higher melt index than component A.

As shown in FIG. 1, the blend according to the present invention comprises about 5 percent (the line between 2 and 3) to about 94 percent (point 5) of the second component B, the second component described above (percent by weight). Again, in the ternary graph, point B represents 100 percent of this second component and the line between points A and C represents zero percent of this component of blend 1.

In a preferred embodiment, the second component B is preferably a minor component (i.e., less than 50 weight percent), more preferably present in the amount of from 10–30 weight percent, even more preferably 10–25 weight percent, most preferably about 20 weight percent, based on the weight of the blend. In one particular embodiment, however, the amount of component B is about 10 to about 18 weight percent.

The blend according to the present invention also contains a third component, component C, which is a polyethylene copolymer providing good heat seals. Preferably, the third component, component C in FIG. 1, is a low density polyethylene copolymer comprising a $C_3$–$C_{10}$ alpha-olefin, more preferably $C_6$–$C_8$ alpha-olefin, and even more preferably a octene-ethylene copolymer or hexene-ethylene copolymer. In yet a more preferred embodiment, the third component in the blend according to the present invention is a linear low density polyethylene hexene-ethylene copolymer having a melt index of 1.0-dg/min to 10-dg/min, more preferably 2.0-dg/min to 4.0-dg/min, at 190° C., a swell ratio of less than 1.3, more preferably less than 1.2, and most preferably 1.1 or below, an annealed density of about 0.90-g/cc to 0.92-g/cc, and a polydispersity index at or below 4. In the most preferable embodiment, the melt index of the hexene-ethylene copolymer is 2.0-dg/min (plus or minus 0.5 dg/min). The hexene component in the most preferred embodiment ranges from about 7 weight percent to about 10 weight percent, based on the weight of the hexene-ethylene copolymer. The alpha-olefin-ethylene copolymer may be manufactured by methods known in the art, such as described in the aforementioned U.S. Pat. No. 4,339,507.

In FIG. 1, component C, or the third component of the blend described above, is present in the amount of about 5 percent (the line described by 2-5) to about 65 percent (the line described by 3-4)(weight percent). Again, point C in FIG. 1 represents 100% of component C, and the line between points A and B represents zero percent of this component.

More preferably, this third component is a minor component (i.e., less than 50 weight percent), even more preferably present in the amount of about 5 to 25 percent.

The substrate to which the blend according to the present invention is applied is preferably a primed substrate. The primer is preferably a water soluble primer. In an even more preferred embodiment, the substrate is primed with polyethyleneimine. After priming, the primed surface is then extrusion coated with the blend. The polyethyleneimine used to prime the various substrates to be extrusion coated with the present invention is most preferably MICA Corporation's A-131X. Extrusion coating methods are per se well-known in the art. The skilled artisan, in possession of the present invention, could readily select any of the above-described polyethylene components, blend them according to the ternary graph shown in FIG. 1 according to the percentages represented by point 1 in the figure, and extrusion coat or extrusion laminate them onto primed or unprimed surfaces to make a composite or laminate, respectively.

The aforementioned blend according to the present invention, when extrusion coated onto a substrate, will preferably have a bond strength, as hereinafter defined, of at least 450-g/inch in 5 minutes or less, more preferably in 1 minute or less.

The blend may be extrusion coated to a substrate or extrusion laminated between two substrates. Extrusion coating and laminating means are well-known in the art. The laminating process may further include the step of preparing a film of the blend according to the present invention. The film may be, for instance, a cast or blown film. Again, the skilled artisan in possession of the present disclosure would be well-aware of how to prepare a film from the blend according to the present invention.

The substrate to which the blend according to the present invention may be coated or laminated may be any substrate to which polyolefins are ordinarily coated. Examples include, but are not limited to, paper or paperboard (printed or unprinted, coated—e.g., clay-coated—or uncoated), metal foils, plastic and other polymeric layers, and the like. These surfaces may be primed or unprimed.

A laminate according to the present invention comprises 2 substrates, each of which may be, independently, primed or unprimed on the surface facing the other substrate, with the polyethylene blend composition I in FIG. 1 between the substrates. In such a laminate, the substrates may be similar or dissimilar, i.e., they may both be paper or one may be paper and the other may be a polymer film.

The skilled artisan, in possession of the present disclosure, can determine the optimum conditions for coating or lamination (experimental conditions, priming, etc.) without undue experimentation.

Of course it is to be understood that the blend according to the present invention can contain other ingredients, such as additional polyethylene components, fillers, slip agents, tackifiers, pigments, etc., as known in the art, as long as they do not detract from the bonding performance of the present invention.

EXPERIMENTAL

In the following examples, the properties are determined as follows:

Melt Index as used herein is determined in accordance with ASTM D1238-62T at 374° F. (190° C.).

Swell ratio is defined as the ratio of the diameter of the extrudate over that of the orifice diameter of the extrusion plastometer in ASTM D1238-62T. The diameter of the specimen is measured in the area between 0.159-cm and 0.952-cm of the initial portion of the specimen as it emerges from the extrusion plastometer. Measurements were made by standard methods according to ASTM D374.

Annealed density was determined in accordance with ASTM D1505.

Polydispersity index is the ratio of the weight-average molecular weight, $M_w$, to number-average molecular weight, $M_n$. $M_w$ and $M_n$ were obtained by size-exclusion chromatography on a Waters 150C gel permeation chromatograph equipped with the standard refractometer detector and a Viscotek 150R differential viscometer system. The 3-column set consisted of Waters' $10^3$, $10^4$, and linear-mixed bed ($10^3$, $10^4$, and $10^5$) Micro-Styragel HT columns. The samples were run as 0.125% (weight/volume) solutions in ortho-dichlorobenzene at 140° C. The data were interpreted using Viscotek Unical software (V4.02), by universal calibration using NBS 1475 (linear polyethylene) and NBS 1476 (branched polyethylene) for any polyethylene sample.

Bond strength between a polyethylene blend coating and a polyethylenemine-primed substrate surface is measured on an Instron Tensile Tester, Model R-F, equipped with a 10-lb (4540-g) load cell and using Testworks computer software, version 3.0. Test specimens are 1.094-inch (2.78-cm) wide strips obtained by first manually separating the polyethylene coating from the primed film substrate. The substrate and coating are then pulled at a separation rate of 6-inch/min (15.2-cm/min) at which rate bond strength, in grams/inch, is noted.

Heat seal strength is determined by thermally welding opposing polymer coating specimens, each 1.094-inch (2.78-cm) wide, using a Sentinel Bar Sealer, Model R-F. The top sealing bar only is heated to 400° F. (205° C.), with the non-heated bottom sealing bar protected with a teflon tape. The opposing coatings are clamped between the sealing bars at a force of 37.62-psi (2.65-Kg/cm$^2$) for 2.0-seconds. Sealed specimens are then tested for seal strength in an Instron Tensile Tester, Model 1011, equipped with a 10-lb (4540-g) load cell, at a separation rate of 6.0-in/min (15.2-cm/min). Seal strength, in grams/inch, is noted.

The following specific examples are meant to illustrate the present invention. Numerous modifications and variations are possible, and it is to be understood that within the scope of the appended claims, the invention may be practiced otherwise than as specifically described herein.

Example 1-Comparative

Dow Chemical Company's linear low density polyethylene formula 3010 is a blend of about 20% by weight of a low density homopolymer polyethylene and about 80% by weight of a copolymer of octene and ethylene, containing about 7% to 10% by weight of octene. This formulation was extrusion coated, a process well known in the art, to a 48-gauge nylon film which had first been primed with MICA's A-131X polyethyleneimine. The polymer was applied to the primed nylon film at a melt temperature of 621° F. (328° C.) at a sufficient extrusion rate to achieve a coating weight of 9.4-lb/3000-ft$^2$ (15.2-g/m$^2$) at 800-fpm (245-m/min).

The bond strength between the coating and the polyethyleneimine primed surface (tested less than 1-minute after coating) measured a lessthan-satisfactory 300-grams. Further, the coating required 15-minutes to achieve the desired minimum bond strength of 450-grams/inch. Meanwhile, some 12,000 linear feet (3,700-meters) of questionable product was produced.

The final bond strength of this structure ultimately reached 594-grams/inch, but this required a curing time of 2-hours.

Heat seal strength was 3730-grams/inch.

Example 2

A 3-component polymeric blend according to the present invention was made by blending the following components as previously described more fully above:

1) 15 weight percent of a 2.0-dg/min melt index linear low density polyethylene hexene-ethylene copolymer, LT724-X or CM757-X from Eastman Chemical Company, Kingsport, TN, designed to be used in cast film and blown film applications;
2) 20 weight percent of a 18–22-dg/min melt index, broad molecular weight distribution polyethylene homopolymer having a polydispersity index above 9, 811A from Eastman Chemical Company, Kingsport, TN, designed for injection molding applications;
3) 65% weight percent of a 1.7-dg/min melt index, narrow molecular weight polyethylene homopolymer having a polydispersity index at or below 9, Eastacoat® polyethylene (D4027P) from Eastman Chemical Company, Kingsport, TN.

The resultant melt index of this blend was 3.0-dg/min. This formulation was extrusion coated to a 48-gauge nylon film which had first been primed with MICA's A-131X polyethyleneimine. The polymer was applied to the primed nylon film at a melt temperature of 619° F. (326° C.) at a sufficient extrusion rate to achieve a coating weight of 9.4-lb/3000-ft$^2$ (15.2-g/m$^2$) at 800-fpm (245-m/min).

The bond strength between the coating and the polyethyleneimine primed surface, tested less than 1-minute after coating, measured a more than acceptable 598-grams/inch. With no subsequent curing time required to be assured of satisfactory bond strength, there was no question about the quality of the product being produced using the blend of the present invention.

Heat seal strength was 3700-grams/inch, essentially equal to that of Example 1, which contains about 65 weight percent more linear low density polyethylene.

Example 3

Another blend according to the present invention was made by blending the following components previously described more fully above:

1) 30 weight percent of the 2.0-dg/min melt index hexene-ethylene copolymer;
2) 20 weight percent of the 18–22-dg/min melt index, broad molecular weight polyethylene homopolymer;
3) 50% weight percent of the 1.7 melt index, narrow molecular weight polyethylene homopolymer.

The resultant melt index of this blend was 3.2-dg/min.

This formulation was extrusion coated to a 48-gauge nylon film which had first been primed with MICA's A-131X polyethyleneimine. The polymer was applied to the primed nylon film at a melt temperature of 617° F. (325° C.) at a sufficient extrusion rate to achieve a coating weight of 9.4-lb/3000-ft$^2$ (15.2-g/m$^2$) at 800-fpm (245-m/min).

The bond strength between the coating and the polyethyleneimine primed surface (again, tested less than 1-minute after coating) measured a more than acceptable 555-grams/inch. With no subsequent curing time required to be assured of satisfactory bond strength, there was no question about the quality of the product being produced using the blend of the present invention.

Heat seal strength was 3980-grams/inch, greater than the composition of Example 1, that composition containing 50 weight percent more linear low density polyethylene.

Example 4

Another blend according to the present invention was made by blending the following components as previously described above:

1) 45 weight percent of the 2.0-dg/min melt index hexene-ethylene copolymer;
2) 20 weight percent of the 18–22-dg/min melt index, broad molecular weight polyethylene homopolymer;
3) 35% weight percent of the 1.7 melt index, narrow molecular weight polyethylene homopolymer.

The resultant melt index of this blend was 3.3-dg/min.

This formulation was extrusion coated to a 48-gauge nylon film which had first been primed with MICA's A-131X polyethyleneimine. The polymer was applied to the primed nylon film at a melt temperature of 627° F. (331° C.) at a sufficient extrusion rate to achieve a coating weight of 9.4-lb/3000-ft$^2$ (15.2-g/m$^2$) at 800-fpm (245-m/min).

The bond strength between the coating and the polyethyleneimine primed surface (tested less than 1-minute after coating) measured a more than acceptable 696-grams/inch. With no subsequent curing time required to be assured of satisfactory bond strength, there was no question about the quality of the product being produced using the blend of the present invention.

Heat seal strength was 4050-grams/inch, greater than the composition of Example 1, that composition containing 35 weight percent more linear low density polyethylene.

Example 5

Another 3-component polymeric blend was made by blending the following components as previously described more fully above:

1) 60 weight percent of the 2.0-dg/min melt index hexene-ethylene copolymer;
2) 20 weight percent of the 18–22-dg/min melt index, broad molecular weight polyethylene homopolymer;
3) 20 weight percent of the 1.7 melt index, narrow molecular weight polyethylene homopolymer.

The resultant melt index of this blend was 3.5-dg/min.

This formulation was extrusion coated, a process well known in the arts, to a 48-gauge nylon film which had first been primed with MICA's A-131X polyethyleneimine. The polymer was applied to the primed nylon film at a melt temperature of 632° F. (333° C.) at an extrusion rate designed to achieve a coating weight of 9.4-lb/3000-ft$^2$ (15.2-g/m$^2$) at 800-fpm (245-m/min). However, this composition failed to coat uniformly at 800-fpm (245-nm/min) because of surging. The line speed was subsequently reduced to 530-fpm (165-m/min) to eliminate the surging, applying a final, uniform coating weight of 14.2-lb/3000-ft$^2$ (23.0-g/m$^2$)

The bond strength between this coating and the polyethyleneimine primed surface (tested less than 1-minute after coating) measured a more than acceptable 570-grams/inch.

With no subsequent curing time required to be assured of satisfactory bond strength, there was no question about the quality of the product being produced using the blend of the present invention.

Heat seal strength was 5490-grams/inch, significantly greater than the composition of Example 1, that composition containing 20 weight percent more linear low density polyethylene.

This example shows that, because of processing problems at fast line speeds, the maximum amount of the linear low density component in the present invention is about 60 weight percent, when fast line speeds are desired. However, this example also shows that the present invention, containing 60 weight percent of linear low density polyethylene, can be extrusion coated at slow line speeds which are common in the industry.

Examples 2 through 5 unexpectedly show a superiority of the present invention over that of the prior art two-component blend illustrated in Example 1. The present invention solves the prior art composition's problem of inadequate initial bonding to a polyethyleneimine-primed substrate.

Examples 2 through 5 also unexpectedly show a superior heat seal strength of the present invention over the heat seal strength of the prior art two-component blend illustrated in Example 1. It would have been predicted that the prior art composition illustrated in Example 1, containing a significantly greater weight percent of linear low density polyethylene, would have exhibited stronger heat seals.

Accordingly, the present inventors have shown that a blend comprising three different components obtained or derived or containing polyethylene provides a useful composition of matter particularly suited for extrusion coatings that quickly provide for strong adhesion to a substrate.

The invention has been described above in detail with particular reference to preferred embodiments thereof, but it will be understood that variations and modifications other than as specifically described herein can be effected within the spirit and scope of the invention. Moreover, all patents, patent applications, provisional patent applications, and literature references cited above are incorporated herein by reference for any disclosure pertinent to the practice of this invention.

We claim:

1. A composition comprising a blend of:
   (a) 1 to 90 weight percent of a low melt index, medium density polyethylene with a narrow molecular weight distribution, having a melt index of from about 0.5-dg/min to about 10-dg/min and a polydispersity index of 9 or less,
   (b) 5 to 94 weight percent of a low density polyethylene homopolymer having a broad molecular weight distribution, having a melt index from about 3-dg/min to about 40-dg/min, and a polydispersity index of greater than 9; and
   (c) 5 to 65 weight percent of a linear low density polyethylene $C_3$–$C_{10}$ alpha-olefin-ethylene copolymer having a melt index of from about 1-dg/min to about 10-dg/min, and a polydispersity index of 4 or less,
wherein the total amount of components (a), (b) and (c) is sufficient to provide a composition suitable for extrusion coating.

2. The composition according to claim 1, wherein:
   component (a) is present in the amount of 20 to 65 weight percent and has a melt index of from about 0.5-dg/min to about 4-dg/min;
   component (b) is present in the amount of 10–30 weight percent, and has a melt index higher than that of component (a); and
   component (c) is present in the amount of from 5–25 weight percent, and is a linear low density $C_6$–$C_8$ alpha-olefin-ethylene copolymer having a melt index of about 2.0-dg/min.

3. The composition according to claim 1, wherein:
   component (a) is present in the amount of greater than 50 weight percent;
   component (b) is present in the amount of 10–25 weight percent, and is a low density polyethylene of broad molecular weight distribution having a melt index of from about 18-dg/min to about 22-dg/min,
   component (c) is present in the amount of from 5–25 weight percent, and is a linear low density polyethylene hexene-ethylene copolymer having a melt index of about 2.0-dg/min.

4. An article comprising a substrate and a coating thereon, wherein said coating comprises a blend comprising:
   (a) 1 to 90 weight percent of a low melt index, medium density polyethylene with a narrow molecular weight distribution, having a melt index of from about 0.5-dg/min to about 10-dg/min and a polydispersity index of 9 or less;
   (b) 5 to 94 weight percent of a low density polyethylene homopolymer having a broad molecular weight distribution, having a melt index from about 3-dg/min to about 40-dg/min, and a polydispersity index of greater than 9; and
   (c) 5 to 65 weight percent of a linear low density polyethylene $C_3$–$C_{10}$ alpha-olefin-ethylene copolymer having a melt index of from about 1-dg/min to about 10-dg/min, and a polydispersity index of 4 or less,
wherein the total amount of components (a), (b) and (c) is sufficient to provide a composition suitable for extrusion coating.

5. The article according to claim 4, wherein said composite further comprises a primer coating between said substrate and said coating.

6. The article according to claim 5, wherein said primer is a polyethyleneimine.

7. The article according to claim 4, wherein said coating comprises:
   component (a) in the amount of 20 to 65 weight percent and having a melt index of from about 0.5-dg/min to about 4-dg/min;
   component (b) in the amount of 10–30 weight percent, and having a melt index higher than that of component (a); and
   component (c) in the amount of from 5–25 weight percent, wherein component (c) is a linear low density polyethylene hexene-ethylene copolymer having a melt index of about 2.0-dg/min.

8. The article according to claim 5, wherein said substrate is selected from the group consisting of paper, paperboard, metal foil, and polymeric films.

9. The article according to claim 4, comprising two substrates separated by said coating.

10. The article according to claim 9, wherein said two substrates are the same and are selected from the group consisting of paper, paperboard, metal foil, and polymeric films.

11. The article according to claim 9, wherein said two substrates are different and are independently selected from the group consisting of paper, paperboard, metal foil, and polymeric films.

12. The article according to claim 10, wherein at least one of said substrates has a primer layer between it and said coating.

13. The article according to claim 11, wherein at least one of said substrates has a primer layer between it and said coating.

14. A process comprising extrusion coating onto a primed substrate a blend according to claim 1, wherein the bond strength between said coating and said primed substrate is at least 450 grams/inch in 5 minutes or less.

15. The process according to claim 14, wherein said bond strength is at least 450 grams/inch in 1 minute or less.

16. The process according to claim 14, wherein said primed substrate is primed with a polyethyleneimine primer.

* * * * *